United States Patent
Kameyama et al.

(10) Patent No.: US 8,068,645 B2
(45) Date of Patent: Nov. 29, 2011

(54) APPARATUS, METHOD, AND PROGRAM FOR IMAGE PROCESSING

(75) Inventors: Hirokazu Kameyama, Kanagawa-ken (JP); Akira Yoda, Kanagawa-ken (JP); Wataru Ito, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 870 days.

(21) Appl. No.: 11/434,200

(22) Filed: May 16, 2006

(65) Prior Publication Data

US 2006/0257041 A1 Nov. 16, 2006

(30) Foreign Application Priority Data

May 16, 2005 (JP) ................................. 2005-142690

(51) Int. Cl.
*G06K 9/00* (2006.01)
(52) U.S. Cl. ...................................................... 382/118
(58) Field of Classification Search .................... 382/118
See application file for complete search history.

(56) References Cited

U.S. PATENT DOCUMENTS

| | | | | |
|---|---|---|---|---|
| 7,257,239 | B2 * | 8/2007 | Rowe et al. ................... | 382/118 |
| 2004/0081338 | A1 * | 4/2004 | Takenaka ..................... | 382/118 |

FOREIGN PATENT DOCUMENTS

JP 2003-162730 A 6/2003

OTHER PUBLICATIONS

T.F. Cootes et al., "Active Appearance Models", Proc. European Conference on Computer Vision, vol. 2, pp. 484-498, Springer, 1998.*
T. Wilhelm, H.J. Bohme, and H.M. Gross, "Classification of face images for gender, age, facial expression, and identity", In Proc. 15th Int. Conf. on Artificial Neural Networks: Biological Inspirations, Warsaw, Poland. Lectures Notes in Computer Science vol. 3696, pp. 569-574, 2005.*
T. F. Cootes et al, Active Appearance Models, Proc. European Conference on Computer Vision, vol. 2, Springer, 1998.
Notice of Grounds for Rejection, dated Dec. 14, 2010, issued in corresponding JP Application No. 2005-142690, 3 pages in English and Japanese.
Decision of Rejection, dated Feb. 22, 2011, issued in corresponding JP Application No. 2005-142690, 1 page in English and 1 page in Japanese.

* cited by examiner

*Primary Examiner* — Samir Ahmed
*Assistant Examiner* — Fred Hu
(74) *Attorney, Agent, or Firm* — Sughrue Mion, PLLC

(57) ABSTRACT

In order to cause a structure such as a human face in an image to become unidentifiable while causing the image to have a natural finish, a parameter acquisition unit obtains weighting parameters representing a characteristic of an individual in a face region in the image by fitting to the face region detected by a face detection unit a mathematical model generated by a method of AAM using a plurality of sample images representing human faces. A reconstruction unit changes the weighting parameters to become smaller, and reconstructs the face region by using the parameters having been changed.

10 Claims, 8 Drawing Sheets

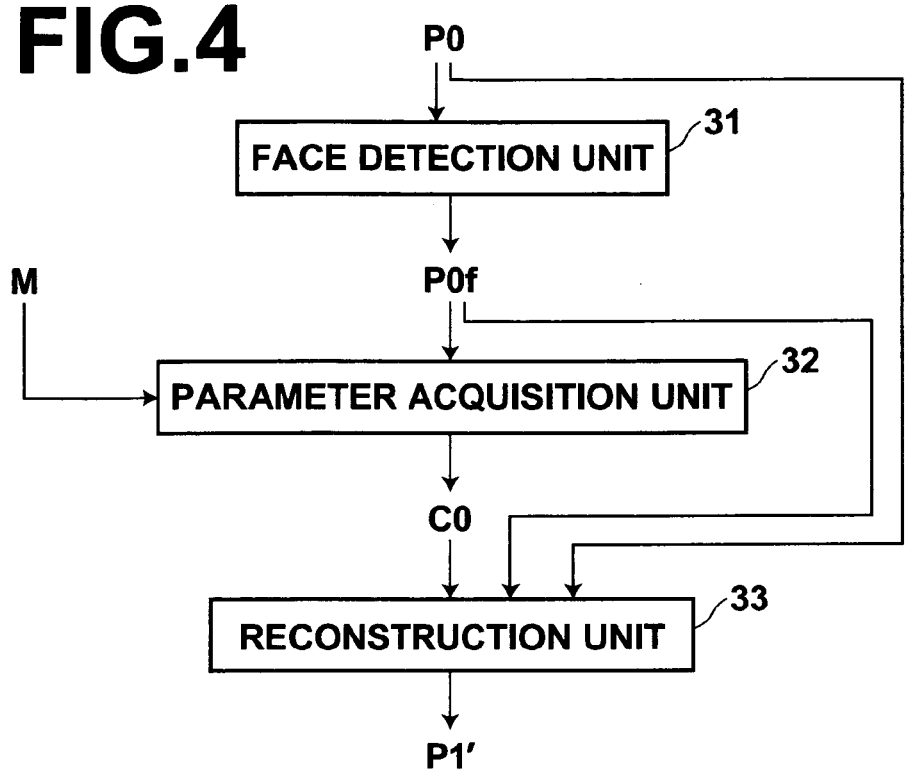
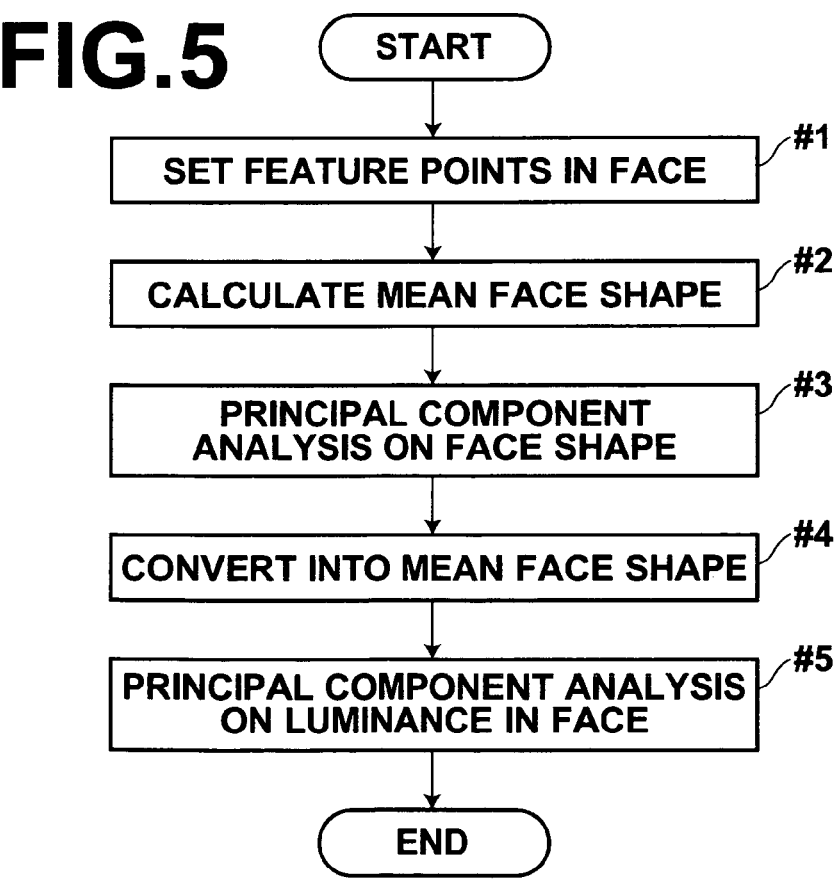

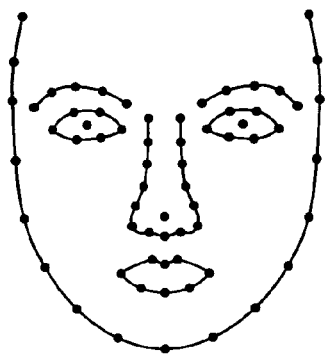
FIG.6
FIG.7
                    −3sd              0            +3sd
THE FIRST PRINCIPAL COMPONENT 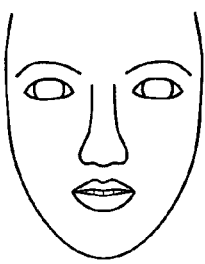 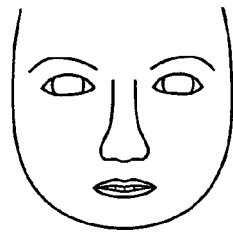
THE SECOND PRINCIPAL COMPONENT 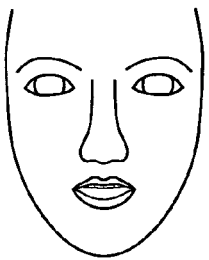 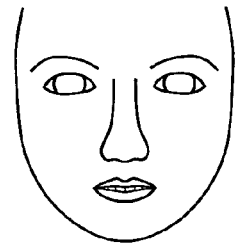 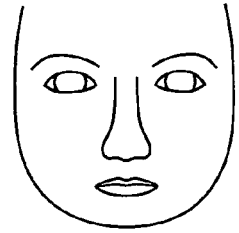

APPARATUS, METHOD, AND PROGRAM FOR IMAGE PROCESSING

BACKGROUND OF THE INVENTION

1. Field of the Invention

The present invention relates to an image processing apparatus and an image processing method for changing a characteristic of a subject included in an input image. The present invention also relates to a program for causing a computer to execute the image processing method.

2. Description of the Related Art

In order to find a specific person such as a person on a wanted list, a system has been realized for recording an image of the general public by using a monitor camera installed in an airport, station, shopping center, and street corner, for example. In such a system, a photographed image is conventionally recorded as it is. Alternatively, only face images are extracted from a photographed image and recorded. However, face images of people other than a specific person are also recorded in these methods, and privacy is not protected regarding portrait rights.

For this reason, a method has been proposed in U.S. Patent Application Publication No. 20040081338 for carrying out mosaic processing on a face other than a predetermined face in an image in advance. In this manner, information for identifying a person other than the person of the predetermined face is lost in the image, and privacy is protected for people other than the predetermined person.

However, an image does not look natural in the case where the image has been subjected to mosaic processing.

SUMMARY OF THE INVENTION

The present invention has been conceived based on consideration of the above circumstances. An object of the present invention is therefore to cause a structure in an image to become unidentifiable while causing the image to have a natural finish.

An image processing apparatus of the present invention comprises:

parameter acquisition means for obtaining a weighting parameter for a statistical characteristic quantity representing a characteristic of a predetermined structure of a subject in an input image by fitting a model representing the structure to the structure in the input image, the model obtained by carrying out predetermined statistical processing on a plurality of images representing the predetermined structure regarding a plurality of subjects, and the model representing the structure by one or more statistical characteristic quantities including the statistical characteristic quantity representing the characteristic of the structure of each of the subjects and by weighting parameter or parameters for weighting the statistical characteristic quantity or quantities according to the characteristic of the structure of each of the subjects; and reconstruction means for changing a value of the weighting parameter so as to cause the statistical characteristic quantity representing the characteristic of the structure of the subject in the input image to be weighted less and for reconstructing an image representing the structure according to the weighting parameter having been changed.

An image processing method of the present invention comprises the steps of:

obtaining a weighting parameter for a statistical characteristic quantity representing a characteristic of a predetermined structure of a subject in an input image by fitting a model representing the structure to the structure in the input image, the model obtained by carrying out predetermined statistical processing on a plurality of images representing the predetermined structure regarding a plurality of subjects, and the model representing the structure by one or more statistical characteristic quantities including the statistical characteristic quantity representing the characteristic of the structure of each of the subjects and by weighting parameter or parameters for weighting the statistical characteristic quantity or quantities according to the characteristic of the structure of each of the subjects; and changing a value of the weighting parameter so as to cause the statistical characteristic quantity representing the characteristic of the structure of the subject in the input image to be weighted less and reconstructing an image representing the structure according to the weighting parameter having been changed.

An image processing program of the present invention is a program for causing a computer to execute the image processing method (that is, a program for causing a computer to function as the means described above).

The image processing apparatus, the image processing method, and the image processing program of the present invention will be described below in detail.

As a method of generating the model representing the predetermined structure in the present invention, a method of AAM (Active Appearance Model) can be used. An AAM is one of approaches in interpretation of the content of an image by using a model. For example, in the case where a human face is a target of interpretation, a mathematical model of human face is generated by carrying out principal component analysis on face shapes in a plurality of images to be learned and on information of luminance after normalization of the shapes. A face in a new input image is then represented by principal components in the mathematical model and corresponding weighting parameters, for face image reconstruction (T. F. Cootes et al., "Active Appearance Models", Proc. European Conference on Computer Vision, vol. 2, Springer, 1998; hereinafter referred to as Reference 1).

It is preferable for the predetermined structure to be suitable for modeling. In other words, variations in shape and color of the predetermined structure in images thereof preferably fall within a predetermined range. Especially, it is preferable for the predetermined structure to generate the statistical characteristic quantity or quantities contributing more to the shape and color thereof through statistical processing thereon. Furthermore, it is preferable for the predetermined structure to be a main part of image. More specifically, the predetermined structure can be a human face in the case where the subject is a person.

The plurality of images representing the predetermined structure regarding the plurality of subjects may be images obtained by actually photographing the predetermined structure of the plurality of subjects. Alternatively, the images may be generated through simulation based on a photographed image of the structure.

It is preferable for the predetermined statistical processing to be dimension reduction processing that can represent the predetermined structure by the statistical characteristic quantity or quantities of fewer dimensions than the number of pixels representing the predetermined structure. More specifically, the predetermined statistical processing may be multivariate analysis such as principal component analysis. In the case where principal component analysis is carried out as the predetermined statistical processing, the statistical characteristic quantity or quantities refers/refer to a principal component/principal components obtained through the principal component analysis.

In the case where the predetermined statistical processing is principal component analysis, principal components of higher orders contribute more to the shape and color than principal components of lower orders.

The statistical characteristic quantity or quantities need(s) to represent information on the characteristic of the structure for each of subjects.

The statistical characteristic quantity representing the characteristic of the structure of each of the subjects may be a single statistical characteristic quantity or a plurality of statistical characteristic quantities.

The (predetermined) structure of the subject in the input image may be detected automatically or manually. In addition, the present invention may further comprise the step (or means) for detecting the structure of the subject in the input image. Alternatively, the structure may have been detected in the input image in the present invention.

Only one manner may be allowed for the change of the weighting parameter. Alternatively, a plurality of manners may be allowed for the change, such as changes for gender, age, and nation.

In the present invention, a plurality of models may be prepared for respective properties of the predetermined structure. In this case, the steps (or means) may be added to the present invention for obtaining any one or more of the properties of the structure in the input through image and for selecting one of the models according to the property having been obtained. The weighting parameter can be obtained by fitting the selected model to the structure in the input image.

The properties refer to gender, age, and race in the case where the predetermined structure is human face. The property may be information for identifying an individual. In this case, the models for the respective properties refer to models for respective individuals.

As a specific method of obtaining the property may be listed image recognition processing having been known (such as image recognition processing described in Japanese Unexamined Patent Publication No. 11(1999)-175724). Alternatively, the property may be inferred or obtained based on information such as GPS information accompanying the input image.

Fitting the model representing the structure to the structure in the input image refers to calculation for representing the structure in the input image by the model. More specifically, in the case where the method of AAM described above is used, fitting the model refers to finding values of the weighting parameters for the respective principal components in the mathematical model.

Changing the value of the weighting parameter refers to changing the value of the parameter to be smaller so that the individual characteristic of the structure is not represented in the input image.

According to the image processing apparatus, the image processing method, and the image processing program of the present invention, the weighting parameter is obtained for the statistical characteristic quantity representing the characteristic of the structure of the subject in the input image, by fitting to the structure in the input image the model representing the structure with use of the statistical characteristic quantity or quantities including the statistical characteristic quantity representing the characteristic of the structure of each of the subjects and the weighting parameter or parameters therefor. The value of the weighting parameter for the statistical characteristic quantity representing the characteristic of the structure of the subject can then be changed to become smaller. Therefore, appearance of the characteristic of the structure of the subject can be prevented in the input image, and the characteristic can be removed from the input image without appearance of an unnatural pattern generated through mosaic processing, for example.

In the case where the subject is human being and the predetermined structure is human face, a face is often a main part in an image. Therefore, characteristic of the face can be removed without causing the main part to become unnatural.

In the case where the step (or the means) for detecting the structure in the input image is added, the structure can be detected automatically. Therefore, the image processing apparatus becomes easier to operate.

In the case where the plurality of models are prepared for the respective properties of the predetermined structure in the present invention while the steps (or the means) are added for obtaining the property of the structure in the input image and for selecting one of the models in accordance with the property having been obtained, if the weighting parameter is obtained by fitting the selected model to the structure in the input image, the structure in the input image can be fit to the model that is more suitable. Therefore, processing accuracy is improved.

Note that the program of the present invention may be provided being recorded on a computer readable medium. Those who are skilled in the art would know that computer readable media include, but are not limited to: floppy disks, magnetic tapes, CD's, hard disks, RAM's, ROM's, and internet downloads, by which computer instructions may be transmitted. Transmission of the computer instructions through a network or through wireless transmission means is also within the scope of the present invention. In addition, the computer instructions may be in the form of object, source, or executable code, and may be written in any language, including higher level languages, assembly language, and machine language.

BRIEF DESCRIPTION OF THE DRAWINGS

FIG. 4 is a block diagram showing details of characteristic removal processing in one aspect of the present invention;

FIG. 5 is a flow chart showing a procedure for generating a mathematical model of face image in the present invention;

FIG. 6 shows an example of how feature points are set in a face;

FIG. 7 shows how a face shape changes with change in values of weight coefficients for eigenvectors of principal components obtained through principal component analysis on the face shape;

DESCRIPTION OF THE PREFERRED EMBODIMENTS

Hereinafter, embodiments of the present invention will be described with reference to the accompanying drawings.

Figure 1:
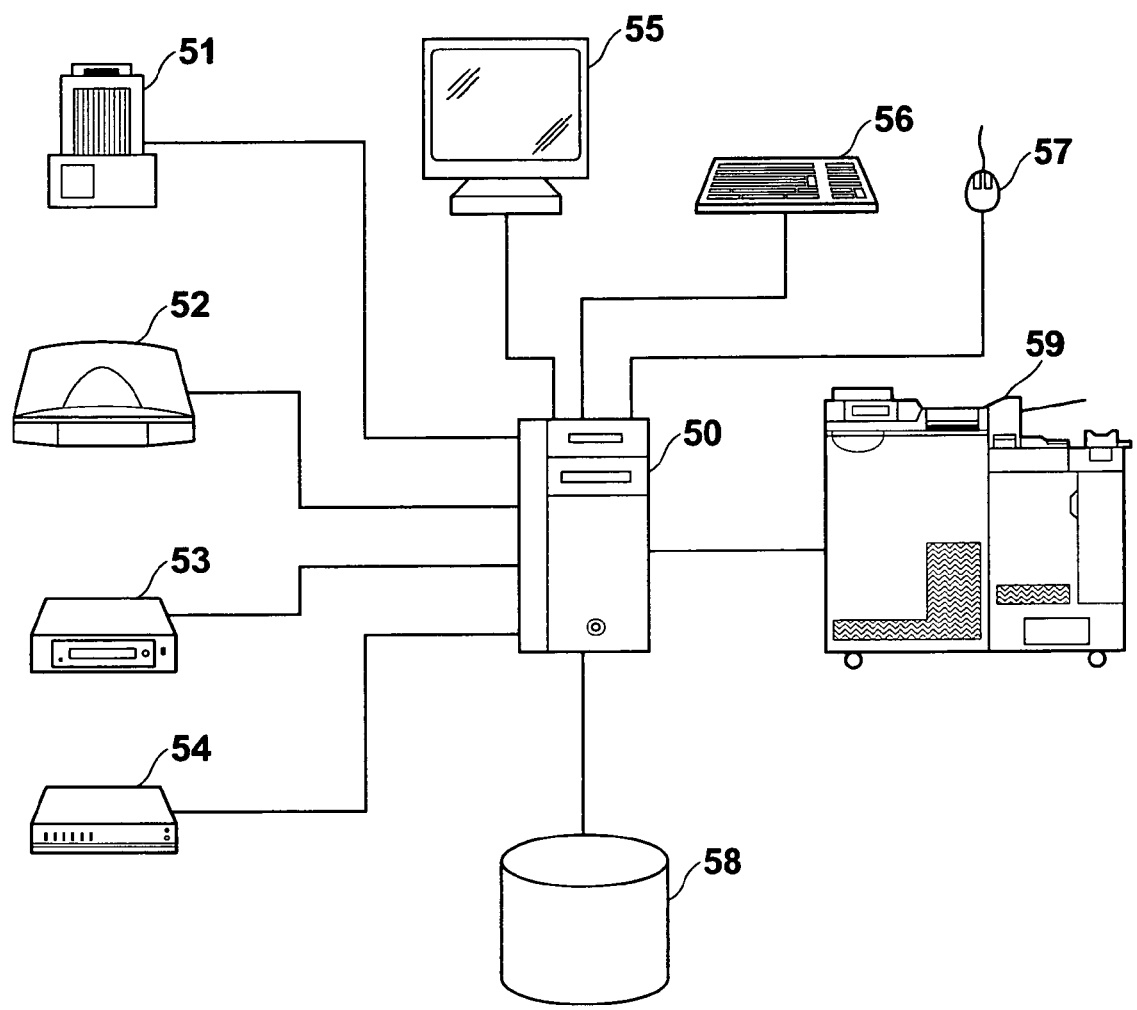
FIG. 1 shows the hardware configuration of a digital photograph printer in an embodiment of the present invention.

FIG. 1 shows the hardware configuration of a digital photograph printer in an embodiment of the present invention. As shown in FIG. 1, the digital photograph printer comprises a film scanner 51, a flat head scanner 52, a media drive 53, a network adapter 54, a display 55, a keyboard 56, a mouse 57, a hard disc 58, and a photographic print output machine 59, all of which are connected to an arithmetic and control unit 50.

In cooperation with the CPU, a main storage, and various input/output interfaces of the arithmetic and control unit 50, the unit 50 controls a processing flow regarding an image, such as input, correction, manipulation, and output thereof, by executing a program installed from a recording medium such as a CD-ROM. In addition, the arithmetic and control unit 50 carries out image processing calculation for image correction and manipulation. Characteristic removal processing of the present invention is also carried out by the arithmetic and control unit 50.

The film scanner 51 photoelectrically reads an APS negative film or a 135-mm negative film developed by a film developer (not shown) for obtaining digital image data P0 representing a photograph image recorded on the negative film.

The flat head scanner 52 photoelectrically reads a photograph image represented in the form of hard copy such as an L-size print, for obtaining digital image data P0.

The media drive 53 obtains digital image data P0 representing a photograph image recorded in a recording medium such as a memory card, a CD, and a DVD. The media drive 53 can also write image data P2 to be output therein. The memory card stores image data representing an image photographed by a digital camera, for example. The CD or the DVD stores data of an image read by the film scanner regarding a previous print order.

The network adapter 54 obtains image data P0 from an order reception machine (not shown) in a network photograph service system having been known. The image data P0 are image data used for a photograph print order placed by a user, and sent from a personal computer of the user via the Internet or via a photograph order reception machine installed in a photo laboratory.

The display 55 displays an operation screen for input, correction, manipulation, and output of an image by the digital photograph printer. A menu for selecting the content of operation and an image to be processed are displayed thereon, for example. The keyboard 56 and the mouse 57 are used for inputting a processing instruction.

The hard disc 58 stores a program for controlling the digital photograph printer. In the hard disc 58 are also stored temporarily the image data P0 obtained by the film scanner 51, the flat head scanner 52, the media drive 53, and the network adapter 54, in addition to image data P1 having been subjected to image correction (hereinafter referred to as the corrected image data P1) and the image data P2 having been subjected to image manipulation (the image data to be output).

The photograph print output machine 59 carries out laser scanning exposure of photographic printing paper, image development thereon, and drying thereof, based on the image data P2 representing the image to be output. The photograph print output machine 59 also prints printing information on the backside of the paper, cuts the paper for each print, and sorts the paper for each order. The manner of printing may be a laser exposure thermal development dye transfer method or the like.

Figure 2:
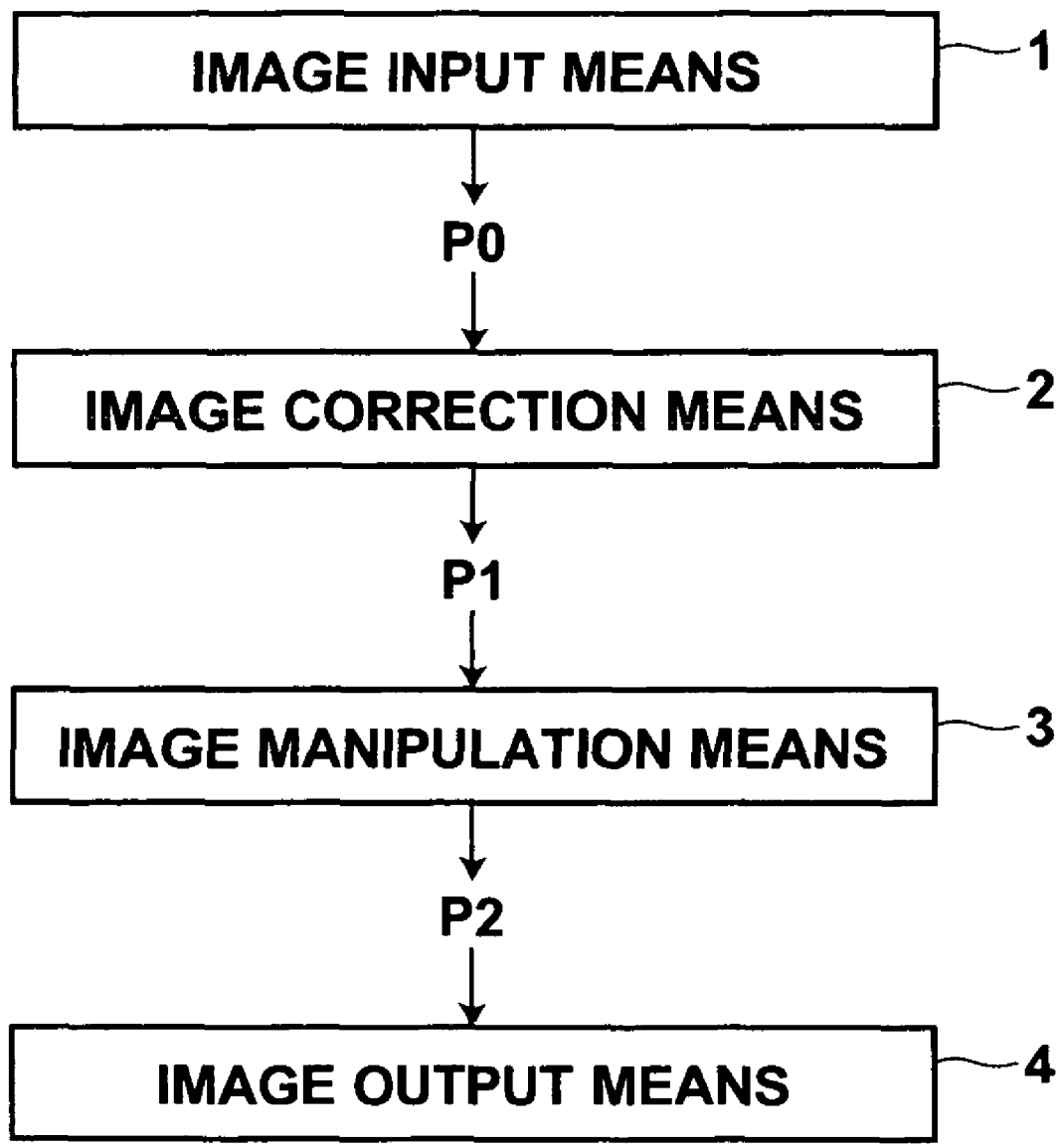
FIG. 2 is a block diagram showing functions and a flow of processing in the digital photograph printer in the embodiment and in a digital camera in another embodiment of the present invention.

FIG. 2 is a block diagram showing functions of the digital photograph printer and the flow of processing carried out therein. As shown in FIG. 2, the digital photograph printer comprises image input means 1, image correction means 2, image manipulation means 3, and image output means 4 in terms of the functions. The image input means 1 inputs the image data P0 of an image to be printed. The image correction means 2 uses the image data P0 as input, and carries out automatic image quality correction of the image represented by the image data P0 (hereinafter, image data and an image represented by the image data are represented by the same reference number) through image processing according to a predetermined image processing condition. The image manipulation means 3 uses the corrected image data P1 having been subjected to the automatic correction as input, and carries out image processing according to an instruction from an operator. The image output means 4 uses the processed image data P2 as input, and outputs a photographic print or outputs the processed image data P2 in a recording medium.

The image correction means 2 carries out processing such as gradation correction, density correction, color correction, sharpness correction, white balance adjustment, and noise reduction and removal, in addition to the characteristic removal processing of the present invention. The image manipulation means 3 carries out manual correction on a result of the processing carried out by the image correction means 2. In addition, the image manipulation means 3 carries out image manipulation such as trimming, scaling, conversion to sepia image, conversion to monochrome image, and composition with an ornamental frame.

Operation of the digital photograph printer and the flow of the processing therein will be described next.

The image input means 1 firstly inputs the image data P0. In the case where an image recorded on a developed film is printed, the operator sets the film on the film scanner 51. In the case where image data stored in a recording medium such as a memory card are printed, the operator sets the recording medium in the media drive 53. A screen for selecting a source of input of the image data is displayed on the display 55, and the operator carries out the selection by using the keyboard 56 or the mouse 57. In the case where film has been selected as the source of input, the film scanner 51 photoelectrically reads the film set thereon, and carries out digital conversion. The image data P0 generated in this manner are then sent to the arithmetic and control unit 50. In the case where hard copy such as a photographic print has been selected, the flat head scanner 52 photoelectrically reads the hard copy set thereon, and carries out digital conversion. The image data P0 generated in this manner are then sent to the arithmetic and control unit 50. In the case where recording medium such as a memory card has been selected, the arithmetic and control unit 50 reads the image data P0 stored in the recording medium such as a memory card set in the media drive 53. In the case where an order has been placed in a network photograph service system or by a photograph order reception machine in a store, the arithmetic and control unit 50 receives the image data P0 via the network adapter 54. The image data P0 obtained in this manner are temporarily stored in the hard disc 58.

The image correction means 2 then carries out the automatic image quality correction on the image represented by the image data P0. More specifically, publicly known processing such as gradation correction, density correction, color correction, sharpness correction, white balance adjustment, and noise reduction and removal is carried out based on a setup condition set on the printer in advance, according to an image processing program executed by the arithmetic and control unit 50. The characteristic removal processing of the present invention is also carried out according to the program, and the corrected image data P1 are output to be stored in a memory of the arithmetic and control unit 50. Alternatively, the corrected image data P1 may be stored temporarily in the hard disc 58.

Figure 3A:
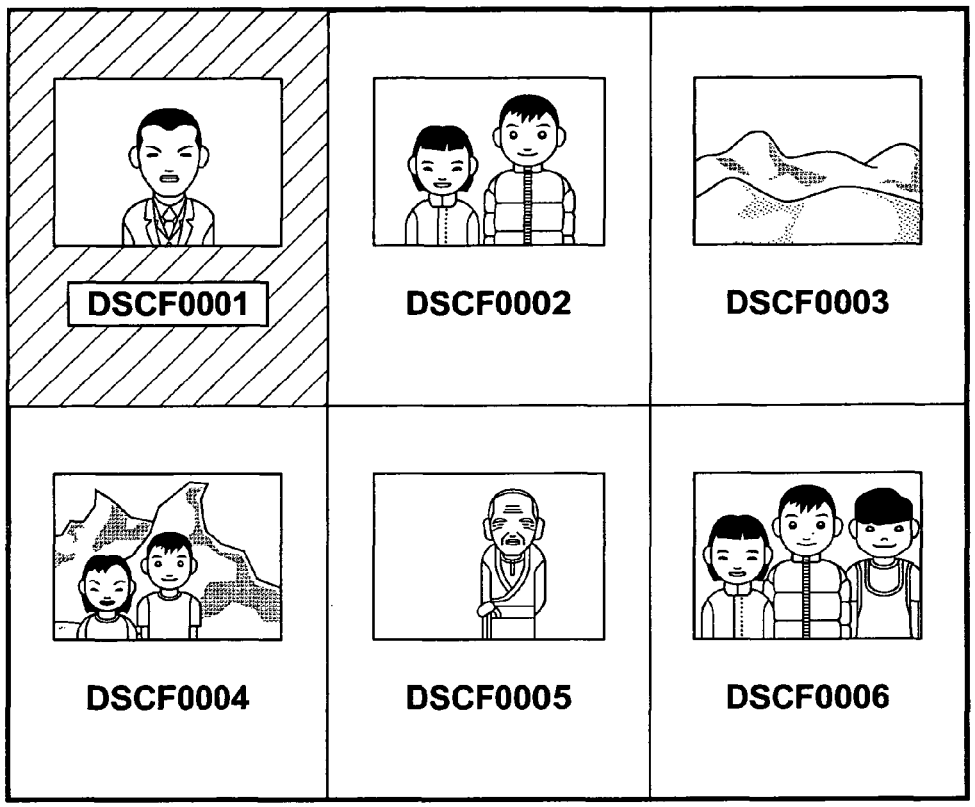
FIGS. 3A and 3B show examples of screens displayed on a display of the digital photograph printer and the digital camera in the embodiments.
Figure 3B:
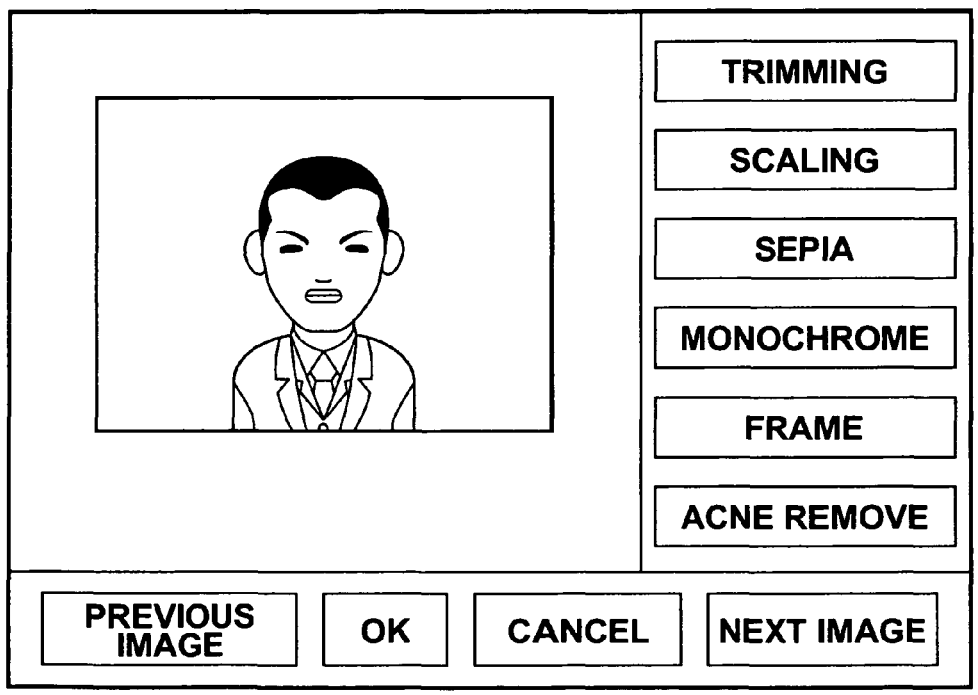

The image manipulation means 3 thereafter generates a thumbnail image of the corrected image P1, and causes the display 55 to display the thumbnail image. FIG. 3A shows an example of a screen displayed on the display 55. The operator confirms displayed thumbnail images, and selects any one of the thumbnail images that needs manual image-quality correction or order processing for image manipulation while using the keyboard 56 or the mouse 57. In FIG. 3A, the image in the upper left corner (DSCF0001) is selected. As shown in FIG. 3B as an example, the selected thumbnail image is enlarged and displayed on the display 55, and buttons are displayed for selecting the content of manual correction and manipulation on the image. The operator selects a desired one of the buttons by using the keyboard 56 or the mouse 57, and carries out detailed setting of the selected content if necessary. The image manipulation means 3 carries out the image processing according to the selected content, and outputs the processed image data P2. The image data P2 are stored in the memory of the arithmetic and control unit 50 or stored temporarily in the hard disc 58. The program executed by the arithmetic and control unit 50 controls image display on the display 55, reception of input from the keyboard 56 or the mouse 57, and image processing such as manual correction and manipulation carried out by the image manipulation means 3.

The image output means 4 finally outputs the image P2. The arithmetic and control unit 50 causes the display 55 to display a screen for image destination selection, and the operator selects a desired one of destinations by using the keyboard 56 or the mouse 57. The arithmetic and control unit 50 sends the image data P2 to the selected destination. In the case where a photographic print is generated, the image data P2 are sent to the photographic print output machine 59 by which the image data P2 are output as a photographic print. In the case where the image data P2 are recorded in a recording medium such as a CD, the image data P2 are written in the CD or the like set in the media drive 53.

The characteristic removal processing of the present invention carried out by the image correction means 2 will be described below in detail. FIG. 4 is a block diagram showing details of the characteristic removal processing. As shown in FIG. 4, the characteristic removal processing is carried out by a face detection unit 31, a parameter acquisition unit 32, and a reconstruction unit 33. The face detection unit 31 detects a face region P0f in the image P0. The parameter acquisition unit 32 fits to the detected face region P0f a mathematical model M generated by a method of AAM (see Reference 1 above) based on a plurality of sample images representing human faces, and obtains weighting parameters C0 for principal components representing a characteristic part in the face region P0f. The reconstruction unit 33 obtains an image P1' by changing values of the weighting parameters C0 to become smaller (hereinafter, the weighting parameters C0 after this change are referred to as the weighting parameters C1) and by reconstructing the face region P0f according to the changed parameters C1. The image P1' is an image subjected only to the characteristic removal processing, and the image P1 is the image having been subjected to all the processing such as the gradation correction and the white balance adjustment. The processing described above is controlled by the program installed in the arithmetic and control unit 50.

The mathematical model M is generated according to a flow chart shown in FIG. 5, and installed in advance together with the programs described above. Hereinafter, how the mathematical model M is generated will be described.

For each of the sample images representing human faces, feature points are set as shown in FIG. 6 for representing face shape (Step #1). In this case, the number of the feature points is 122. However, only 60 points are shown in FIG. 6 for simplification. Which part of face is represented by which of the feature points is predetermined, such as the left corner of the left eye represented by the first feature point and the center between the eyebrows represented by the $38^{th}$ feature point. Each of the feature points may be set manually or automatically according to recognition processing. Alternatively, the feature points may be set automatically and later corrected manually upon necessity.

Based on the feature points set in each of the sample images, mean face shape is calculated (Step #2). More specifically, mean values of coordinates of the feature points representing the same part are found among the sample images.

Principal component analysis is then carried out based on the coordinates of the mean face shape and the feature points representing the face shape in each of the sample images (Step #3). As a result, any face shape can be approximated by Equation (1) below:

$$S = S_0 + \sum_{i=1}^{n} p_i b_i \tag{1}$$

S and S0 are shape vectors represented respectively by simply listing the coordinates of the feature points (x1, y1, ..., x122, y122) in the face shape and in the mean face shape, while pi and bi are an eigenvector representing the $i^{th}$ principal component for the face shape obtained by the principal component analysis and a weight coefficient therefor, respectively. FIG. 7 shows how face shape changes with change in values of the weight coefficients b1 and b2 for the eigenvectors p1 and p2 as the highest and second-highest order principal components obtained by the principal component analysis. The change ranges from −3 sd to +3 sd where sd refers to standard deviation of each of the weight coefficients b1 and b2 in the case where the face shape in each of the sample images is represented by Equation (1). The face shape in the middle of 3 faces for each of the components represents the face shape in the case where the values of the weight coefficients are the mean values. In this example, a component contributing to face outline has been extracted as the first principal component through the principal component analysis. By changing the weight coefficient b1, the face shape changes from an elongated shape (corresponding to −3 sd) to a round shape (corresponding to +3 sd). Likewise, a component contributing to how much the mouth is open and to length of chin has been extracted as the second principal component. By changing the weight coefficient b2, the face changes from a state of open mouth and long chin (corresponding to −3 sd) to a state of closed mouth and short chin (corresponding to +3 sd). The smaller the value of i, the better the component explains the shape. In other words, the $i^{th}$ component contributes more to the face shape as the value of i becomes smaller.

Each of the sample images is then subjected to conversion (warping) into the mean face shape obtained at Step #2 (Step #4). More specifically, shift values are found between each of the sample images and the mean face shape, for the respective feature points. In order to warp pixels in each of the sample images to the mean face shape, shift values to the mean face shape are calculated for the respective pixels in each of the sample images according to 2-dimensional 5-degree polynomials (2) to (5) using the shift values having been found:

$$x' = x + \Delta x \quad (2)$$

$$y' = y + \Delta y \quad (3)$$

$$\Delta x = \sum_{i=0}^{n} \sum_{j=0}^{n-i} a_{ij} \cdot x^i \cdot y^j \quad (4)$$

$$\Delta y = \sum_{i=0}^{n} \sum_{j=0}^{n-i} b_{ij} \cdot x^i \cdot y^j \quad (5)$$

Figure 8:
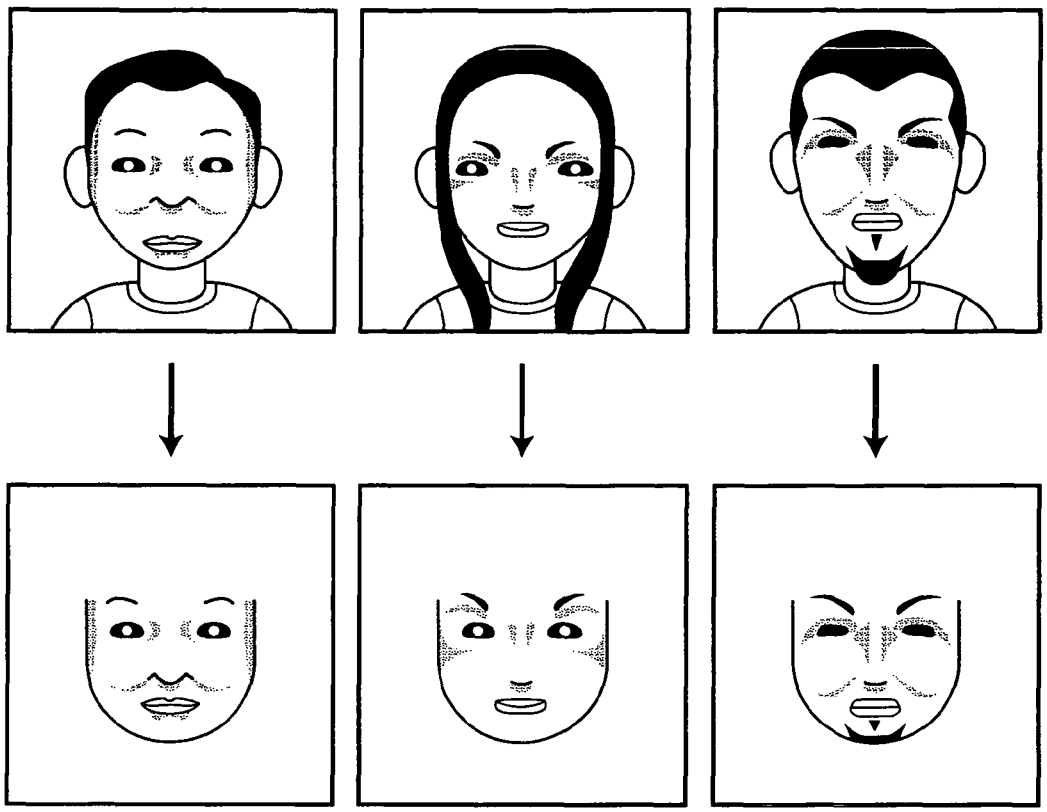
FIG. 8 shows luminance in mean face shapes converted from face shapes in sample images.

In Equations (2) to (5) above, x and y denote the coordinates of each of the feature points in each of the sample images while x' and y' are coordinates in the mean face shape to which x and y are warped. The shift values to the mean shape are represented by $\Delta x$ and $\Delta y$ with n being the number of dimensions while aij and bij are coefficients. The coefficients for polynomial approximation can be found by using a least square method. At this time, for a pixel to be moved to a position represented by non-integer values (that is, values including decimals), pixel values therefor are found through linear approximation using 4 surrounding points. More specifically, for 4 pixels surrounding coordinates of the non-integer values generated by warping, the pixel values for each of the 4 pixels are determined in proportion to a distance thereto from the coordinates generated by warping. FIG. 8 shows how the face shape of each of 3 sample images is changed to the mean face shape.

Thereafter, principal component analysis is carried out, using as variables the values of RGB colors of each of the pixels in each of the sample images after the change to the mean face shape (Step #5). As a result, the pixel values of RGB colors in the mean face shape converted from any arbitrary face image can be approximated by Equation (6) below:

$$A = A_0 + \sum_{i=1}^{m} q_i \lambda_i \quad (6)$$

In Equation (6), A denotes a vector (r1, g1, b1, r2, g2, b2, . . . , rm, gm, bm) represented by listing the pixel values of RGB colors at each of the pixels in the mean face shape (where r, g, and b represent the pixel values of RGB colors while 1 to m refer to subscripts for identifying the respective pixels with m being the total number of pixels in the mean face shape). The vector components are not necessarily listed in this order in the example described above. For example, the order may be (r1, r2, . . . , rm, g1, g2, . . . , gm, b1, b2, . . . , bm). A0 is a mean vector represented by listing mean values of the RGB values at each of the pixels in the mean face shape while qi and $\lambda i$ refer to an eigenvector representing the $i^{th}$ principal component for the RGB pixel values in the face obtained by the principal component analysis and a weight coefficient therefor, respectively. The smaller the value of i is, the better the component explains the RGB pixel values. In other words, the component contributes more to the RGB pixel values as the value of i becomes smaller.

Figure 9:
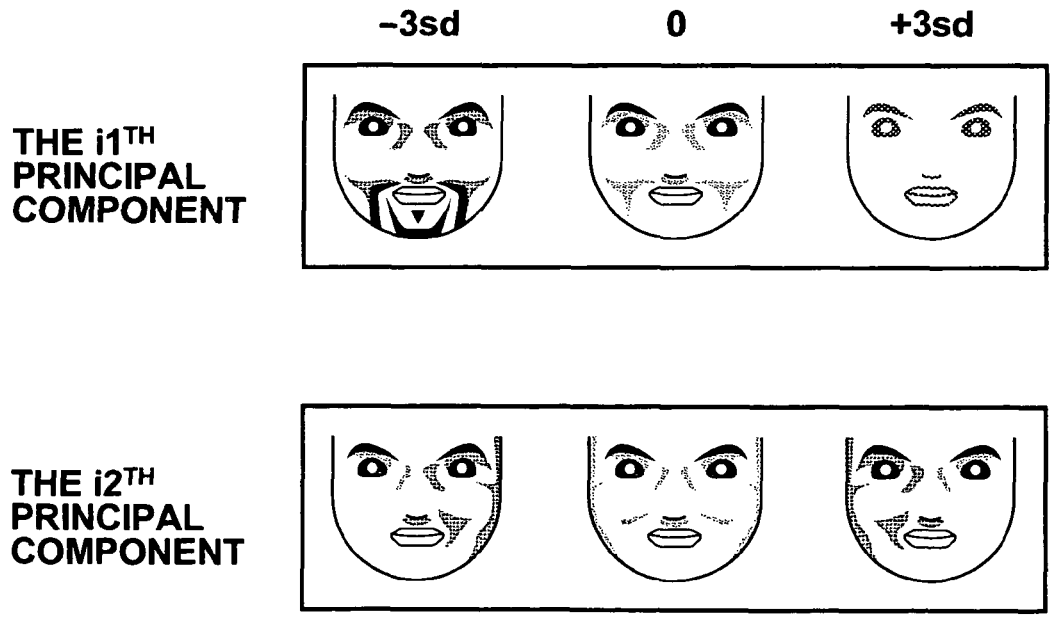
FIG. 9 shows how pixel values in a face change with change in values of weight coefficients for eigenvectors of principal components obtained by principal component analysis on the pixel values in the face.

FIG. 9 shows how faces change with change in values of the weight coefficients $\lambda i1$ and $\lambda i2$ for the eigenvectors qi1 and qi2 representing the $i1^{th}$ and $i2^{th}$ principal components obtained through the principal component analysis. The change in the weight coefficients ranges from −3 sd to +3 sd where sd refers to standard deviation of each of the values of the weight coefficients $\lambda i1$ and $\lambda i2$ in the case where the pixel values in each of the sample face images are represented by Equation (6) above. For each of the principal components, the face in the middle of the 3 images corresponds to the case where the weight coefficients $\lambda i1$ and $\lambda i2$ are the mean values. In the examples shown in FIG. 9, a component contributing to presence or absence of beard has been extracted as the $i1^{th}$ principal component through the principal component analysis. By changing the weight coefficient $\lambda i1$, the face changes from the face with dense beard (corresponding to −3 sd) to the face with no beard (corresponding to +3 sd). Likewise, a component contributing to how a shadow appears on the face has been extracted as the $i2^{th}$ principal component through the principal component analysis. By changing the weight coefficient $\lambda i2$, the face changes from the face with a shadow on the right side (corresponding to −3 sd) to the face with a shadow on the left side (corresponding to +3 sd). How each of the principal components contributes to what factor is determined through interpretation.

In this embodiment, the plurality of face images representing human faces have been used as the sample images. Therefore, the higher-order principal components corresponding to smaller value of i including the first principal component are extracted as the principal components representing a characteristic of each individual. For example, in the case where a component contributing to presence or absence of beard has been extracted as the first principal component, density of beard in the face region P0f in the image P0 is changed with change in the value of the weight coefficient $\lambda 1$ for the eigenvector q1 of the first principal component, for example.

The principal components contributing to a characteristic of each individual are not necessarily extracted as the higher-order principal components corresponding to smaller value of i. In addition, the characteristic of each individual is not necessarily represented by a plurality of principal components. The characteristic may be due to a single principal component.

Through the processing from Step #1 to #5 described above, the mathematical model M can be generated. In other words, the mathematical model M is represented by the eigenvectors pi representing the face shape and the eigenvectors qi representing the pixel values in the mean face shape, and the number of the eigenvectors is far smaller for pi and for qi than the number of pixels forming the face image. In other words, the mathematical model M has been compressed in terms of dimension. In the example described in Reference 1, 122 feature points are set for a face image of approximately 10,000 pixels, and a mathematical model of face image represented by 23 eigenvectors for face shape and 114 eigenvectors for face pixel values has been generated through the processing described above. By changing the weight coefficients for the respective eigenvectors, approximately 98% of variations in face shape and pixel values can be expressed.

A flow of the characteristic removal processing based on the AAM method using the mathematical model M will be described next, with reference to FIG. 4.

The face detection unit 31 reads the image data P0, and detects the face region P0ƒ in the image P0. More specifically, the face region can be detected through various known methods such as a method using a correlation score between an eigen-face representation and an image as has been described in Published Japanese Translation of a PCT Application No. 2004-527863 (hereinafter referred to as Reference 2). Alternatively, the face region can be detected by using a knowledge base, characteristics extraction, skin-color detection, template matching, graph matching, and a statistical method (such as a method using neural network, SVM, and HMM), for example. Furthermore, the face region P0ƒ may be specified manually with use of the keyboard 56 and the mouse 57 when the image P0 is displayed on the display 55. Alternatively, a result of automatic detection of the face region may be corrected manually.

The parameter acquisition unit 32 fits the mathematical model M to the face region P0ƒ. More specifically, the image is reconstructed according to Equations (1) and (6) described above while sequentially changing the values of the weight coefficients bi and λi for the eigenvectors pi and qi corresponding to the principal components in order of higher order in Equations (1) and (6). The values of the weight coefficients bi and λi causing a difference between the reconstructed image and the face region P0ƒ to become minimal are then found (see Reference 2 for details). Among the weight coefficients λi, the weight coefficients λi representing the characteristic of each individual are the parameters C0. In the case where the number of the principal components representing the characteristic of each individual is more than 1, the parameters C0 comprise the weight coefficients therefor. It is preferable for the values of the weight coefficients bi and λi to range only from −3 sd to +3 sd where sd refers to the standard deviation in each of distributions of bi and λi when the sample images used at the time of generation of the model are represented by Equations (1) and (6). In the case where the values do not fall within the range, it is preferable for the weight coefficients to take the mean values in the distributions. In this manner, erroneous application of the model can be avoided.

The reconstruction unit 33 obtains the parameters C1 by causing the values of the parameters C0 to become smaller. It is preferable for the parameters C1 to be 0.

In the case where the number of the principal components representing the characteristic of each individual is larger than 1, the parameters C0 may be found as a linear combination of the weight coefficients as shown by Equation (7) below wherein αi is a coefficient representing a rate of contribution of the $i^{th}$ principal component corresponding to the weight coefficient λi to a difference in the characteristic of each individual. In this case, the parameters C1 are also a linear combination of the weight coefficients corresponding to the characteristic of each individual:

$$C0 = \sum_{i=1}^{J} \alpha_i \lambda_i \quad (7)$$

The reconstruction unit 33 reconstructs the face region P0ƒ′ based on the parameters C1, and obtains the image P1′ from which the characteristic of the individual has been removed.

As has been described above, according to the characteristic removal processing in the embodiment of the present invention, the parameter acquisition unit 32 obtains the weighting parameters C0 for the principal components representing the characteristic of each individual in the face region P0ƒ, by fitting to the face region P0ƒ in the image P0 detected by the face detection unit 31 the mathematical model M generated according to the method of AAM using the sample images representing human faces. The reconstruction unit 33 changes the values of the parameters C0 to obtain the parameters C1, and the face region P0ƒ′ is reconstructed according to the parameters C1. Therefore, the characteristic part in face can be removed without adding an unnatural pattern such as mosaic to the image. Consequently, privacy can be protected in the natural-looking image.

Figure 10:
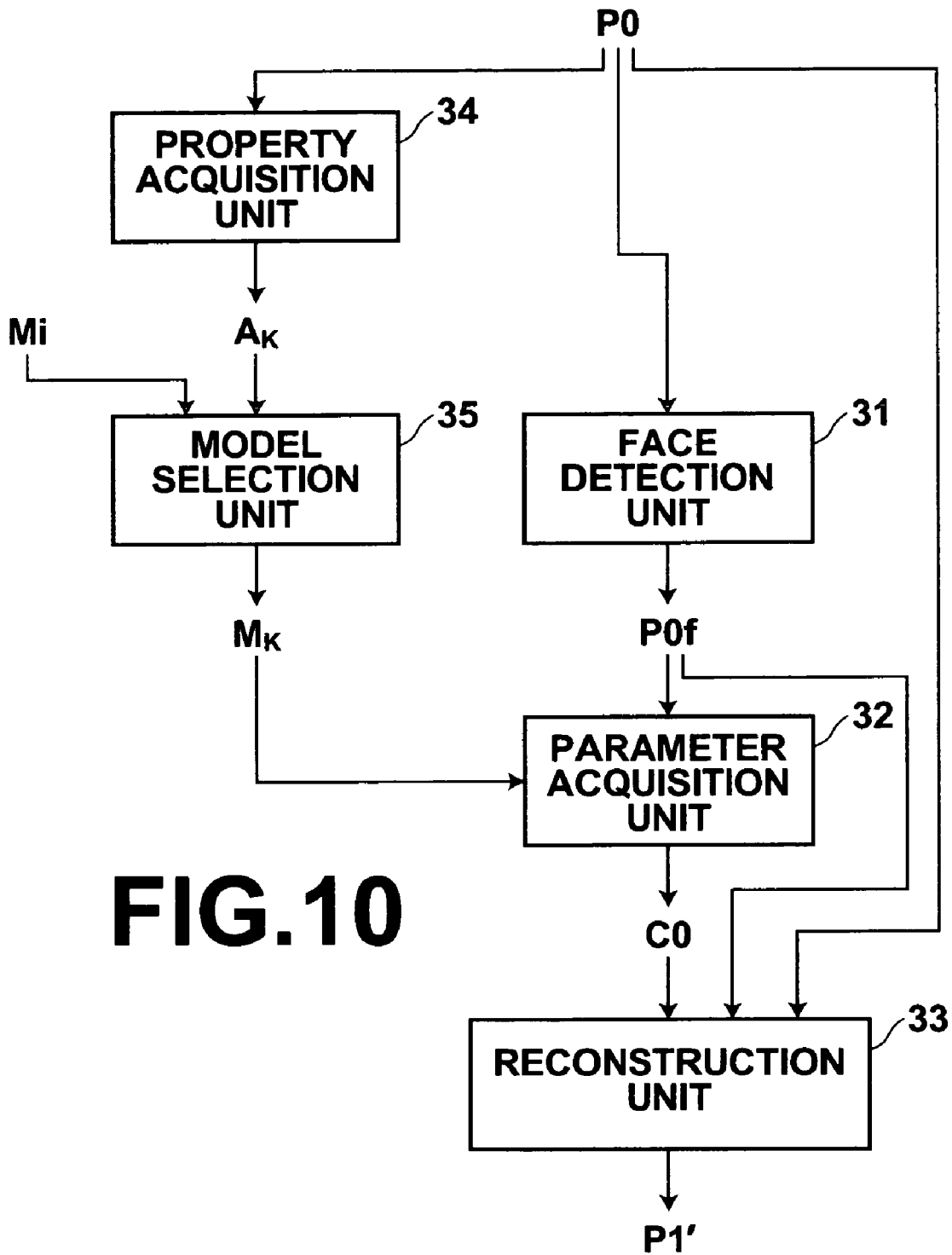
FIG. 10 is a block diagram showing an advanced aspect of the characteristic removal processing in the present invention.
Figure 11:
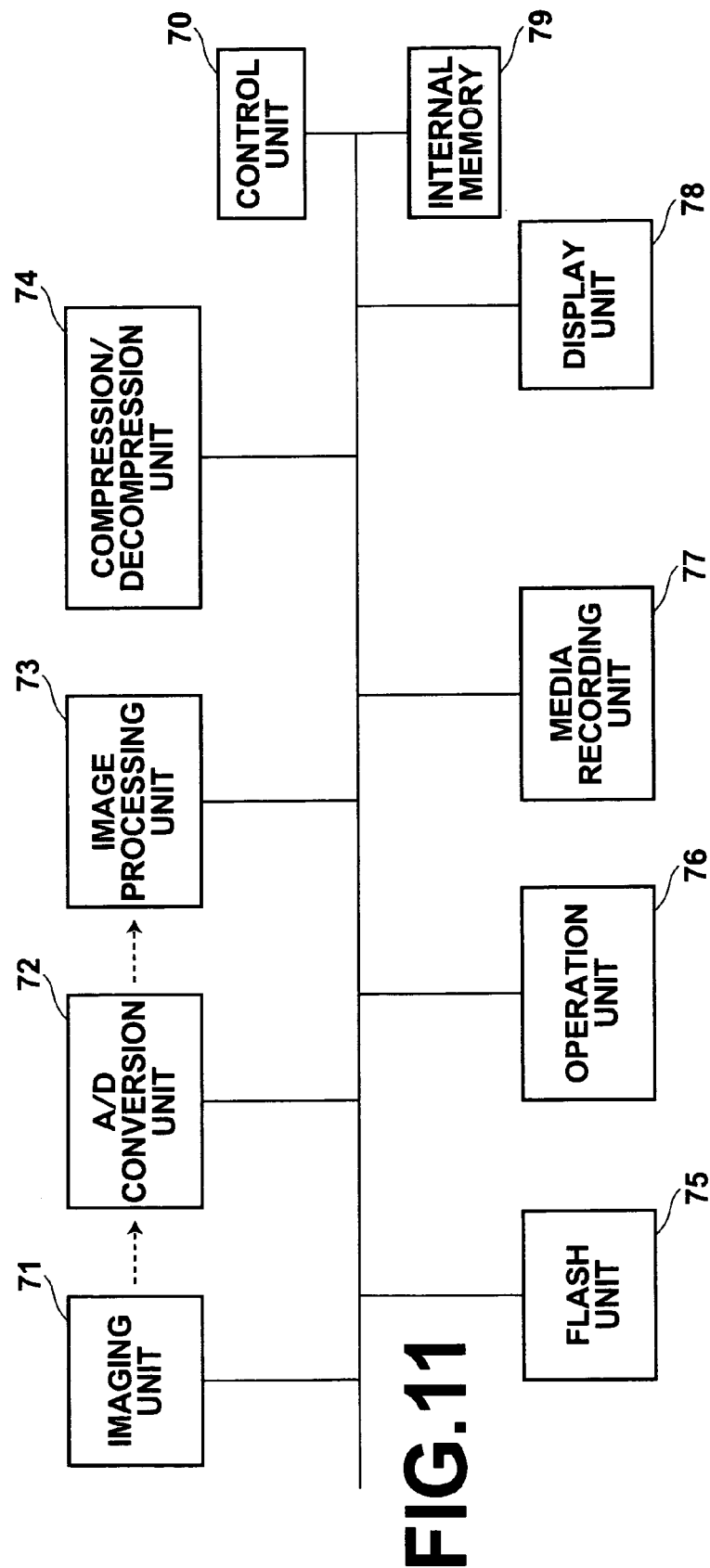
FIG. 11 shows the configuration of the digital camera in the embodiment of the present invention.

In the embodiment described above, the mathematical model M is unique. However, a plurality of mathematical models Mi (i=1, 2, . . . ) may be generated for respective properties such as race, age, and gender, for example. FIG. 10 is a block diagram showing details of characteristic removal processing in this case. As shown in FIG. 11, a property acquisition unit 34 and a model selection unit 35 are added, which is different from the embodiment shown in FIG. 4. The property acquisition unit 34 obtains property information AK of a subject in the image P0. The model selection unit 35 selects a mathematical model MK generated only from sample images representing subjects having a property represented by the property information AK.

The mathematical models Mi have been generated based on the same method (see FIG. 5), only from sample images representing subjects of the same race, age, and gender, for example. The mathematical models Mi are stored by being related to property information Ai representing each of the properties that is common among the samples used for the model generation.

The property acquisition unit 34 may obtain the property information AK by judging the property of the subject through execution of known recognition processing (such as processing described in Japanese Unexamined Patent Publication No. 11(1999)-175724) on the image P0. Alternatively, the property of the subject may be recorded at the time of photography as accompanying information of the image P0 in a header or the like so that the recorded information can be obtained. The property of the subject may be inferred from accompanying information. In the case where GPS information representing a photography location is available, the country or a region corresponding to the GPS information can be identified, for example. Therefore, the race of the subject can be inferred to some degree. By paying attention to this fact, a reference table relating GPS information to information on race may be generated in advance. By inputting the image P0 obtained by a digital camera that obtains the GPS information at the time of photography and records the GPS information in a header of the image P0 (such as a digital camera described in Japanese Unexamined Patent Publication No. 2004-153428), the GPS information recorded in the header of the image data P0 is obtained. The information on race related to the GPS information may be inferred as the race of the subject when the reference table is referred to according to the GPS information.

The model selection unit 35 obtains the mathematical model MK related to the property information AK obtained by the property acquisition unit 34, and the parameter acquisition unit 32 fits the mathematical model MK to the face region P0ƒ in the image P0.

As has been described above, in the case where the mathematical models Mi corresponding to the properties have been prepared, if the model selection unit 35 selects the mathematical model MK related to the property information AK obtained by the property acquisition unit 34 and if the parameter acquisition unit 32 fits the selected mathematical model MK to the face region P0ƒ, the mathematical model MK does not have eigenvectors contributing to variations in face shape and luminance caused by difference in the property information AK. Therefore, the face region P0f can be represented only by eigenvectors representing factors determining the face shape and luminance other than the factor representing the property. Consequently, processing accuracy improves.

In the embodiment described above, the mathematical models are installed in the digital photograph printer in advance. However, from a viewpoint of processing accuracy improvement, it is preferable for mathematical models for different human races to be prepared so that which of the mathematical models is to be installed can be changed according to a country or a region to which the digital photograph printer is going to be shipped.

The function for generating the mathematical model may be installed in the digital photograph printer. More specifically, a program for causing the arithmetic and control unit 50 to execute the processing described by the flow chart in FIG. 5 is installed therein. In addition, a default mathematical model may be installed at the time of shipment thereof. In this case, the mathematical model may be customized based on images input to the digital photograph printer. Alternatively, a new model different from the default model may be generated.

In the embodiment described above, the parameters C0 are changed to the parameters C1, and the face region P0f is reconstructed based on the parameters C1 for obtaining the image P1' from which the characteristic has been removed. However, the image P0 may be displayed on the display 55 so that the operator can change the parameters C0 while viewing how the characteristic is removed from the image P0 with use of the keyboard 56 or the mouse 57. In this case, the parameters C0 causing the image P0 to become desirable are used as the parameters C1. In this manner, the image P1' from which the characteristic has been removed can be obtained.

In the embodiment described above, the individual face image is represented by the face shape, the pixel values of RGB colors, and the weight coefficients bi and λi therefor. However, the face shape is correlated to variation in the pixel values of RGB colors. Therefore, a new appearance parameter c can be obtained for controlling both the face shape and the pixel values of RGB colors as shown by Equations (8) and (9) below, through further execution of principal component analysis on a vector (b1, b2, . . . , bi, . . . , λ1, λ2, . . . , λi, . . . ) combining the weight coefficients bi and λi:

$$S = S_0 + Q_S c \quad (8)$$

$$A = A_0 + Q_A c \quad (9)$$

A difference from the mean face shape can be represented by the appearance parameter c and a vector QS, and a difference from the mean pixel values can be represented by the appearance parameter c and a vector QA.

In the case where this model is used, the parameter acquisition unit 32 finds the face pixel values in the mean face shape based on Equation (9) above while changing a value of the appearance parameter c. Thereafter, the face image is reconstructed by conversion from the mean face shape according to Equation (8) above, and the value of the appearance parameter c causing a difference between the reconstructed face image and the face region P0f to be minimal is found.

Another embodiment of the present invention can be installation of the characteristic removal processing in a digital camera. In other words, the characteristic removal processing is installed as an image processing function of the digital camera. FIG. 11 shows the configuration of such a digital camera. As shown in FIG. 11, the digital camera has an imaging unit 71, an A/D conversion unit 72, an image processing unit 73, a compression/decompression unit 74, a flash unit 75, an operation unit 76, a media recording unit 77, a display unit 78, a control unit 70, and an internal memory 79. The imaging unit 71 comprises a lens, an iris, a shutter, a CCD, and the like, and photographs a subject. The A/D conversion unit 72 obtains digital image data P0 by digitizing an analog signal represented by charges stored in the CCD of the imaging unit 71. The image processing unit 73 carries out various kinds of image processing on image data such as the image data P0. The compression/decompression unit 74 carries out compression processing on image data to be stored in a memory card, and carries out decompression processing on image data read from a memory card in a compressed form. The flash unit 75 comprises a flash and the like, and carries out flash emission. The operation unit 76 comprises various kinds of operation buttons, and is used for setting a photography condition, an image processing condition, and the like. The media recording unit 77 is used as an interface with a memory card in which image data are stored. The display unit 78 comprises a liquid crystal display (hereinafter referred to as the LCD) and the like, and is used for displaying a through image, a photographed image, various setting menus, and the like. The control unit 70 controls processing carried out by each of the units. The internal memory 79 stores a control program, image data, and the like.

The functions of the image input means 1 in FIG. 2 are realized by the imaging unit 71 and the A/D conversion unit 72. Likewise, the functions of the image correction means 2 are realized by the image processing unit 73 while the functions of the image manipulation means 3 are realized by the image processing unit 73, the operation unit 76, and the display unit 78. The functions of the image output means 4 are realized by the media recording unit 77. All of the functions described above are realized under control by the control unit 70 with use of the internal memory 79.

Operation of the digital camera and a flow of processing therein will be described next.

The imaging unit 71 causes light entering the lens from a subject to form an image on a photoelectric surface of the CCD when a photographer fully presses a shutter button. After photoelectric conversion, the imaging unit 71 outputs an analog image signal, and the A/D conversion unit 72 converts the analog image signal output from the imaging unit 71 to a digital image signal. The A/D conversion unit 72 then outputs the digital image signal as the digital image data P0. In this manner, the imaging unit and the A/D conversion unit 72 function as the image input means 1.

Thereafter, the image processing unit 73 carries out gradation correction processing, density correction processing, color correction processing, white balance adjustment processing, and sharpness processing in addition to the characteristic removal processing, and outputs corrected image data P1. In this manner, the image processing unit 73 functions as the image correction means 2. In order to realize the characteristic removal processing, the control unit 70 starts a characteristic removal program stored in the internal memory 79, and causes the image processing unit 73 to carry out the characteristic removal processing (see FIG. 4) using the mathematical model M stored in advance in the internal memory 79, as has been described above.

The image P1 is displayed on the LCD of the display unit 78. As a manner of this display can be used display of thumbnail images as shown in FIG. 3A. While operating the operation buttons of the operation unit 76, the photographer selects and enlarges one of the images to be processed, and carries out selection from a menu for further manual image correction or manipulation. Processed image data P2 are then output. In this manner, the functions of the image manipulation means 3 are realized.

The compression/decompression unit 74 carries out compression processing on the image data P2 according to a compression format such as JPEG, and the compressed image data are written via the media recording unit 77 in a memory card inserted in the digital camera. In this manner, the functions of the image output means 4 are realized.

By installing the characteristic removal processing of the present invention as the image processing function of the digital camera, the same effect as in the case of the digital photograph printer can be obtained.

The manual correction and manipulation may be carried out on the image having been stored in the memory card. More specifically, the compression/decompression unit 74 decompresses the image data stored in the memory card, and the image after the decompression is displayed on the LCD of the display unit 78. The photographer selects desired image processing as has been described above, and the image processing unit 73 carries out the selected image processing.

Furthermore, the mathematical models for respective properties of subjects described by FIG. 10 may be installed in the digital camera. In addition, the processing for generating the mathematical model described by FIG. 5 may be installed therein.

In the embodiments described above, a model for one person and a model for a plurality of people may be generated so that the components representing the characteristic of each individual can be obtained by finding a difference between the models. The components found in this manner are removed from the input image.

A program of the present invention may be incorporated with image editing software for causing a personal computer or the like to execute the characteristic removal processing. In this manner, a user can use the characteristic removal processing of the present invention as an option of image editing and manipulation on his/her personal computer, by installation of the software from a recording medium such as a CD-ROM to the personal computer, or by installation of the software through downloading of the software from a predetermined Web site on the Internet.

What is claimed is:

1. An image processing apparatus comprising:
   parameter acquisition means for obtaining a weighting parameter for a statistical characteristic quantity representing a characteristic of a predetermined structure of a subject in an input image by fitting a model representing the structure to the structure in the input image, the model obtained by carrying out predetermined statistical processing on a plurality of images representing the predetermined structure regarding a plurality of subjects, and the model representing the structure by one or more statistical characteristic quantities including the statistical characteristic quantity representing the characteristic of the structure of each of the subjects and by weighting parameter or parameters for weighting the statistical characteristic quantity or quantities by correlating the shape and the variation in the pixel value of the predetermined structure according to the characteristic of the structure of each of the subjects;
   reconstruction means for changing a value of the weighting parameter so as to cause the statistical characteristic quantity representing the characteristic of the structure of the subject in the input image to be weighted less and for reconstructing an image representing the structure according to the weighting parameter having been changed; and
   selection means for obtaining properties of the structure in the input image and for selecting the models corresponding to the obtained properties from a plurality of the models representing the structure for respective properties of the predetermined structure, and wherein
   the parameter acquisition means obtains the weighting parameter by fitting the selected model to the structure in the input image,
   wherein the selection means obtains photography location information, obtains race information of the structure in the input image based on the photograph location information, and selects the model corresponding to the obtained race information from a plurality of models representing the structure for respective races of the predetermined structure, said model being generated for race.

2. The image processing apparatus according to claim 1, wherein the subject is a unique individual human being and the predetermined structure is a human face having general facial characteristics which are not specific to the unique individual.

3. The image processing apparatus according to claim 1 further comprising detection means for detecting the structure in the input image, wherein
   the parameter acquisition means obtains the weighting parameter by fitting the model to the structure having been detected.

4. An image processing method comprising:
   obtaining a weighting parameter for a statistical characteristic quantity representing a characteristic of a predetermined structure of a subject in an input image by fitting a model representing the structure to the structure in the input image, the model obtained by carrying out via a processor a predetermined statistical processing on a plurality of images representing the predetermined structure regarding a plurality of subjects, and the model representing the structure by one or more statistical characteristic quantities including the statistical characteristic quantity representing the characteristic of the structure of each of the subjects and by weighting parameter or parameters for weighting the statistical characteristic quantity or quantities by correlating the shape and the variation in the pixel value of the predetermined structure according to the characteristic of the structure of each of the subjects;
   changing a value of the weighting parameter so as to cause the statistical characteristic quantity representing the characteristic of the structure of the subject in the input image to be weighted less and reconstructing an image representing the structure according to the weighting parameter having been changed; and
   obtaining properties of the structure in the input image and selecting the models corresponding to the obtained properties from a plurality of the models representing the structure for respective properties of the predetermined structure, and wherein
   obtaining the weighting parameter comprises fitting the selected model to the structure in the input image,
   further including obtaining photography location information, obtaining race information of the structure in the input image based on the photograph location information, and selecting the model corresponding to the obtained race information from a plurality of models representing the structure for respective races of the predetermined structure, said model being generated for race.

5. A non-transitory computer-readable storage medium embedded with an image processing program causing a computer to function as:

parameter acquisition means for obtaining a weighting parameter for a statistical characteristic quantity representing a characteristic of a predetermined structure of a subject in an input image by fitting a model representing the structure to the structure in the input image, the model obtained by carrying out predetermined statistical processing on a plurality of images representing the predetermined structure regarding a plurality of subjects, and the model representing the structure by one or more statistical characteristic quantities including the statistical characteristic quantity representing the characteristic of the structure of each of the subjects and by weighting parameter or parameters for weighting the statistical characteristic quantity or quantities by correlating the shape and the variation in the pixel value of the predetermined structure according to the characteristic of the structure of each of the subjects;

reconstruction means for changing a value of the weighting parameter so as to cause the statistical characteristic quantity representing the characteristic of the structure of the subject in the input image to be weighted less and for reconstructing an image representing the structure according to the weighting parameter having been changed; and selection means for obtaining properties of the structure in the input image and for selecting the models corresponding to the obtained properties from a plurality of the models representing the structure for respective properties of the predetermined structure, and wherein the parameter acquisition means obtains the weighting parameter by fitting the selected model to the structure in the input image, wherein the selection means obtains photography location information, obtains race information of the structure in the input image based on the photograph location information, and selects the model corresponding to the obtained race information from a plurality of models representing the structure for respective races of the predetermined structure, said model being generated for race.

6. The image processing apparatus according to claim 1, wherein said plurality of models are generated for race, age and gender.

7. The image processing apparatus of claim 1, wherein the reconstruction means modifies the characteristic of the predetermined structure in the subjects so that the characteristic is less pronounced than in the input image to resemble one of the plurality of models, said models having minimal weighting parameters.

8. The image processing apparatus of claim 6, wherein the reconstruction means modifies the characteristic of the predetermined structure in the subjects so that the characteristic is less pronounced than in the input image to resemble one of the plurality of models, said models having minimal weighting parameters.

9. The image processing apparatus of claim 7, wherein the reconstruction means operates selectively on subjects in the input image, but not on all subjects in the input image.

10. The image processing apparatus of claim 9, further comprising a reproduction unit, wherein the reproduction unit outputs an image having subjects processed by the reconstruction means and subjects not processed by the reconstruction means.

* * * * *